Figure 1:
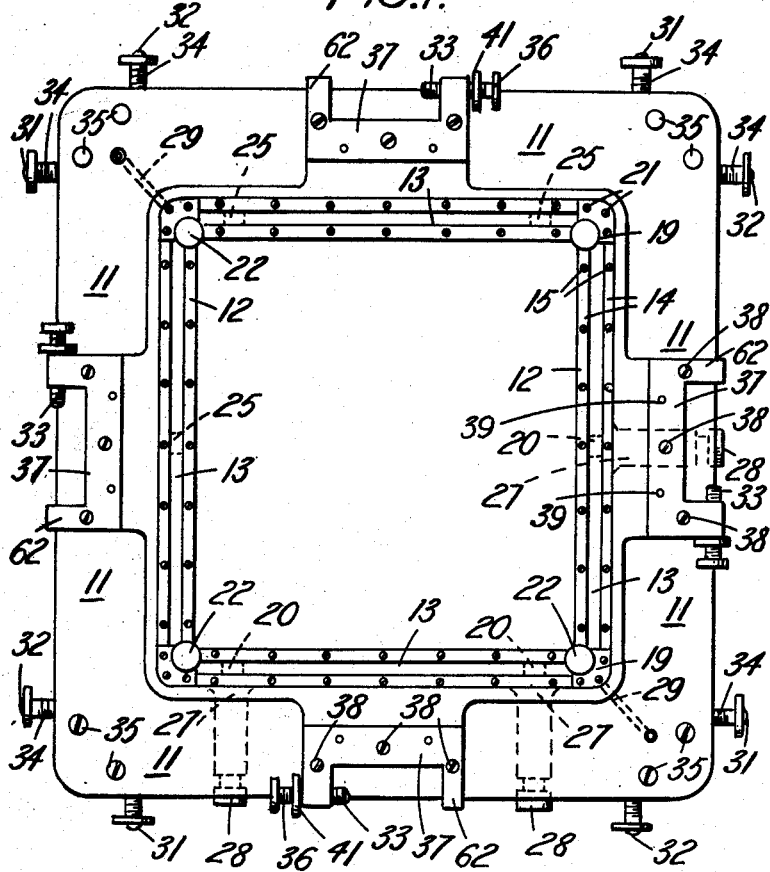

March 31, 1964  C. BRAGG ETAL  3,126,807
HOLDERS FOR PHOTOGRAPHIC NEGATIVES AND THE LIKE
Filed Sept. 7, 1960  7 Sheets-Sheet 1

Inventors: Cecil Bragg
Brian Stanley Pennels
By: Morgan, Finnegan, Durham & Pine
Attorneys

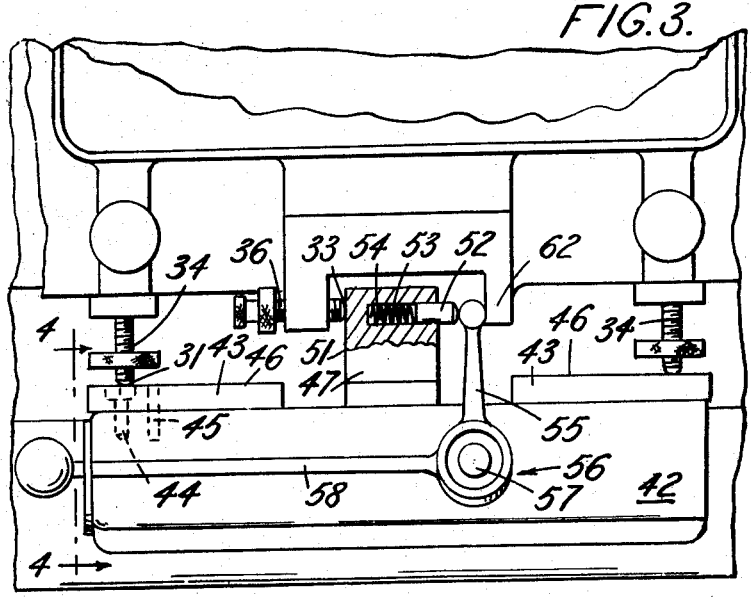

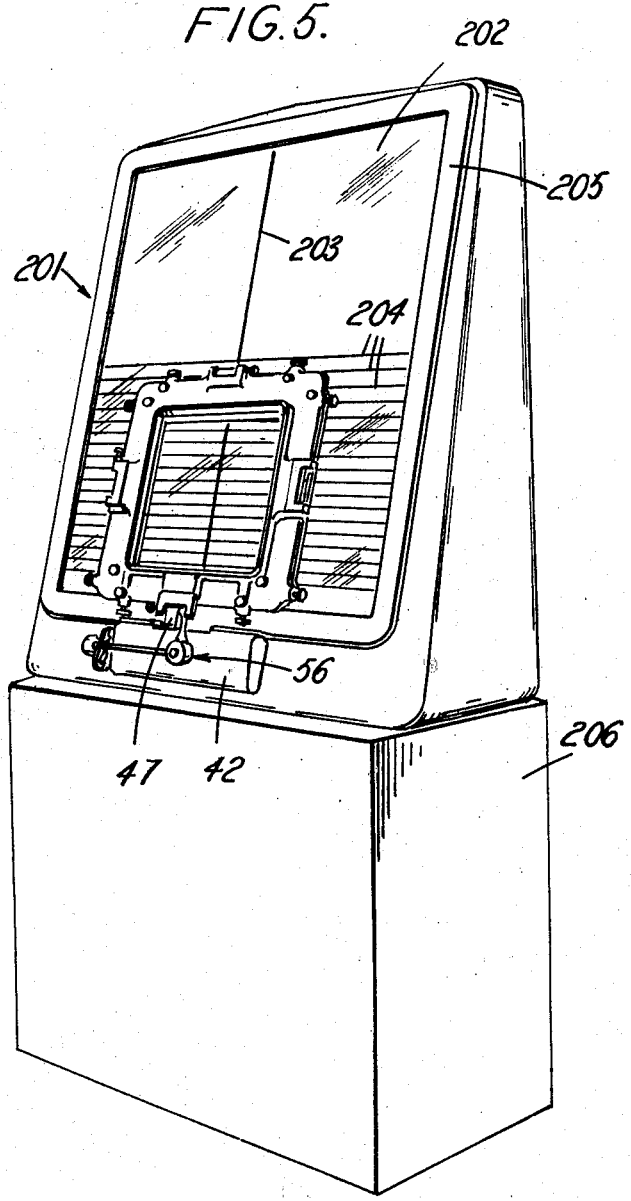

March 31, 1964  C. BRAGG ETAL  3,126,807
HOLDERS FOR PHOTOGRAPHIC NEGATIVES AND THE LIKE
Filed Sept. 7, 1960  7 Sheets-Sheet 4
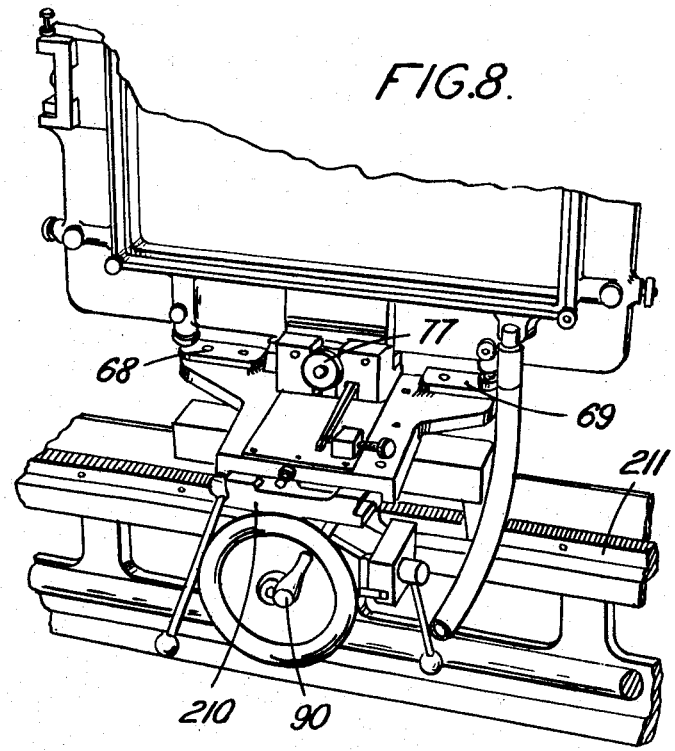
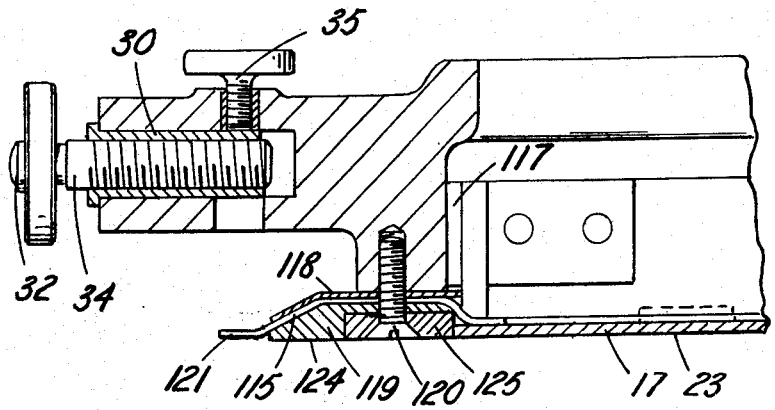
Inventors: Cecil Bragg
Brian Stanley Pennels
By: Morgan, Finnegan, Durham & Pine
Attorneys March 31, 1964 C. BRAGG ETAL 3,126,807
HOLDERS FOR PHOTOGRAPHIC NEGATIVES AND THE LIKE
Filed Sept. 7, 1960 7 Sheets-Sheet 5

Inventors: Cecil Bragg
Brian Stanley Pennels
By: Morgan, Finnegan, Durham & Pine
Attorneys March 31, 1964   C. BRAGG ETAL   3,126,807
HOLDERS FOR PHOTOGRAPHIC NEGATIVES AND THE LIKE
Filed Sept. 7, 1960   7 Sheets-Sheet 6
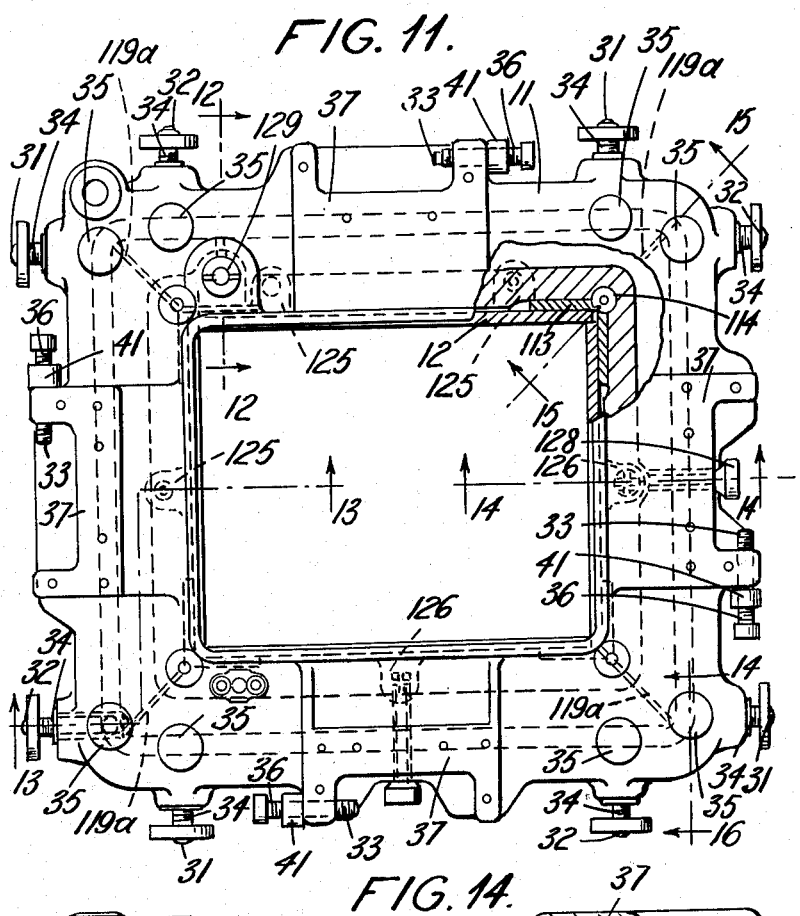
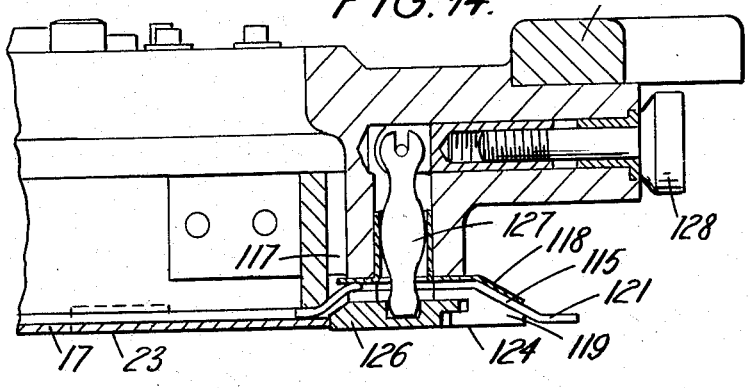
Inventors: Cecil Bragg
Bian Stanley Pennels
By: Morgan, Finnegan, Durham & Pine
Attorneys

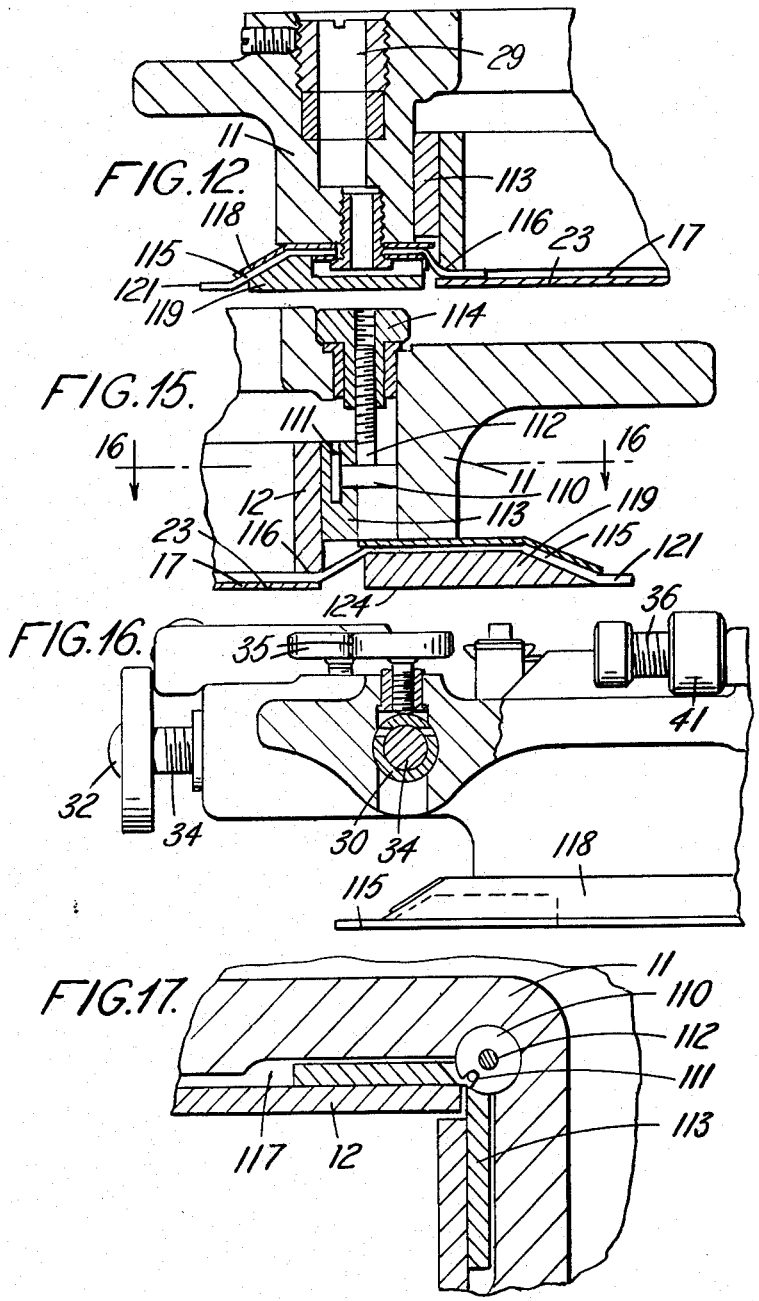

United States Patent Office 3,126,807
Patented Mar. 31, 1964

3,126,807
HOLDERS FOR PHOTOGRAPHIC NEGATIVES
AND THE LIKE
Cecil Bragg, Langley Green, Crawley, and Brian Stanley Pennels, Beechfield, Wadhurst, England, assignors to Pictorial Machinery Limited, Crawley, Sussex, England, a British company
Filed Sept. 7, 1960, Ser. No. 54,525
Claims priority, application Great Britain Sept. 25, 1959
2 Claims. (Cl. 95—73)

This invention relates to holders for negatives, transparencies and the like from which photographic prints are to be made by a step-and-repeat, or other photo-composing machine or other photographic printing apparatus.

The invention provides a holder for a negative, transparency or the like (hereinafter referred to for convenience as a plate) from which one or more photographic prints are to be made, which holder comprises an outer frame, an inner frame or member for carrying the plate and supported within the outer frame for adjusting movement (relative to the outer frame) perpendicular to the plane of the outer frame, and adjustable locating means on the outer frame for locating the holder in a predetermined position or orientation on a step-and-repeat, or other, photo-composing machine or other photographic printing apparatus.

Preferably the outer frame is provided with a plurality of such adjustable locating means spaced around its periphery so that the holder may be located in any one of a corresponding plurality of angularly distinguished predetermined positions or orientations as aforesaid, the rotation of the holder between the said positions or orientations being determined by the angular spacing of the locating means around the outer frame.

Preferably the locating means on the outer frame are adapted to co-operate with locating faces carried by the traversing bar of a step-and-repeat photo-composing machine, and the said locating means are also adapted to co-operate with locating faces carried by a register device carrying one or more reference lines or marks, so that the holder may first be located on the register device in order that a plate carried by the inner frame may, by adjustment of the said locating means, be brought into register with said reference lines or marks, and the holder may then be transferred to, and located on, the said step-and-repeat machine. The plate will then be in a predetermined position or orientation in relation to the said traversing bar.

Preferably the holder is intended for connection to a source of vacuum or reduced air pressure so that a plate carried by the holder may be urged by atmospheric pressure into contact with a photo-sensitive printing plate or other surface, and an airtight flexible diaphragm extends between the inner and outer frames thereby permitting the aforesaid relative adjusting movement between the frames while maintaining an airseal between them.

Figure 2:
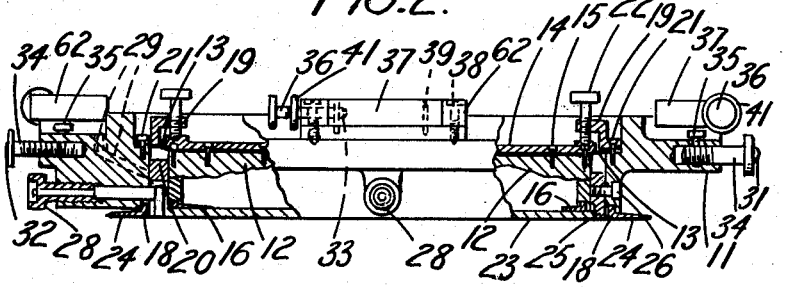
Figure 9:
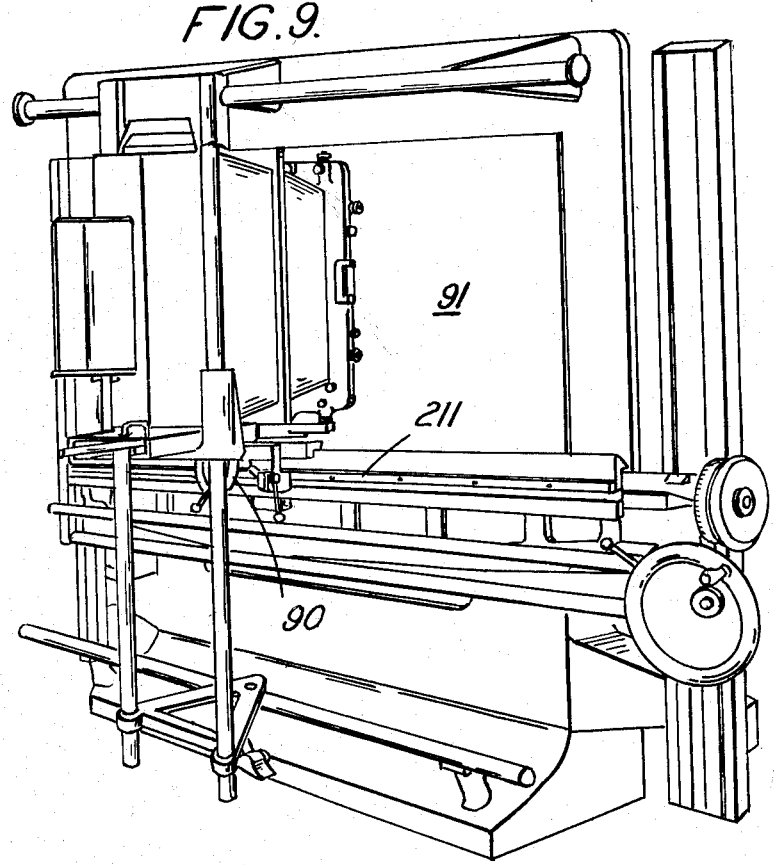
Figure 10:
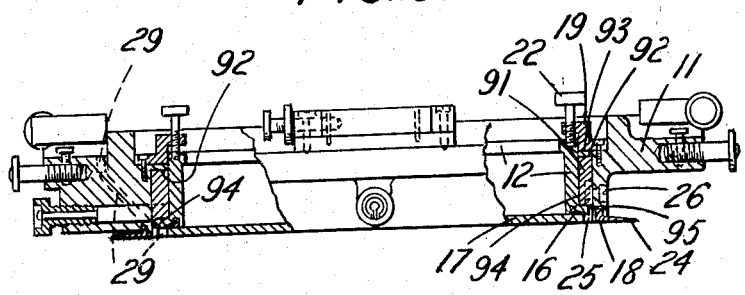

Some specific constructions of apparatus embodying the invention will now be described by way of example and with reference to the accompanying drawings in which:

FIGURE 1 shows one face of a holder,

FIGURE 2 is an end view of the holder of FIGURE 1 with various parts of it shown in section, FIGURE 3 shows an attachment for a known datum or register device with the holder of FIGURES 1 and 2 located thereon, FIGURE 4 is a view of that attachment on the line 4—4 of FIGURE 3, FIGURE 5 is a perspective view of the datum or register device with the attachment and holder as shown in FIGURES 3 and 4, FIGURE 6 is a plan view of an attachment for the saddle of a known step-and-repeat photo-composing machine to permit the holder to be located thereon, FIGURE 7 is a front view of the attachment shown in FIGURE 6, FIGURE 8 shows the attachment of FIGURES 6 and 7 mounted on the saddle of the step-and-repeat photo-composing machine, FIGURE 9 is a perspective view of that machine with the holder of FIGURES 1 and 2 mounted on the attachment of FIGURES 6 and 7 on the saddle of the machine, and with exposure lamp and hood in position for an exposure to be made, FIGURE 10 is a sectional view of part of a modified form of the holder shown in FIGURES 1 and 2, FIGURE 11 is a view, corresponding to FIGURE 1, of a preferred construction of holder, FIGURES 12–16 are respectively sectional views taken on the lines 12—12, 13—13, 14—14, 15—15 and 16—16 of FIGURE 11, and FIGURE 17 shows part of FIGURE 11 to an enlarged scale.

In the construction shown in FIGURES 1 and 2, the holder comprises a metal outer frame 11 surrounding a metal inner frame 12 which is attached to the frame 11 by a flexible airtight sealing member 13, of rubber or like material, which is secured to the frames 11, 12 by metal clamping strips 14 and screws 15. The inner frame 12 is provided around its front edge with an adhesively secured resilient sealing flange 16 for the reception of a glass photographic negative plate 17. The outer frame 11 is provided around its front edge with a continuous resilient sealing flange 18. The outer frame 11 carries four corner brackets 19 secured to it by screws 21. Adjusting screws 22 are screw threaded in the corner brackets 19 and their ends are secured to, but rotatable in, the clamping strips 14 of the inner frame 12. When the front and back faces of the holder are horizontal and the plate 17 rests on the inner frame 12 the adjusting screws 22 may be adjusted to bring the front face 23 of the plate 17 and the front face 24 of the flange 18 into substantially coplanar relationship. The face 23 is the one which bears the photographic image. The plate 17 may then be clamped edgewise in two mutually perpendicular directions, between three pads 25 and three adjustable clamping pads 27 carried by clamping screws 28. The resilience of the sealing member 13 permits the adjusting movement of the inner frame 12 to bring the faces 23 and 24 into coplanar relationship as aforesaid. The inner frame 12 is constrained against movement relative to the outer frame 11 (except for the said adjusting movement perpendicular to the plane of the frames) by six pads 20, 25 which are secured to the outer frame 11 e.g. by screws 26. The pads 20, 25 are of a synthetic laminated resin material such as is available under the trade name "Tufaol." A conduit 29 is provided for connecting the interior of the outer frame 11 to a source of vacuum so that when the faces 23, 24 are placed in contact with a plane surface, such as a photo-sensitive printing plate, those surfaces 23, 24 are urged into close contact with the said plane surface under the action of the vacuum. The resilient flanges 16—18 provide respectively airtight seals with the rear face of the plate 17 and the said flat surface, and the strips 13 provide an airtight seal between the outer frame 11 and the inner frame 12.

In the modification shown in FIGURE 10 the sealing member 13, and its clamping strips 14 and screws 15, are replaced by airtight sponge rubber sealing material 91 bonded at 92 to a flange 93 on the outer frame 11 and bonded at 94 to a flange 95 on the inner frame 12.

In the preferred construction shown in FIGURES 11–17 the holder comprises a metal outer frame 11 surrounding a metal inner frame 12. The inner frame 12 is spaced apart from the outer frame 11 and is located therein by four corner sections 113 mounted on the corners of the inner frame 12. The sections 113 and the inner frame 12 are adjustable within the outer frame 11 by four adjusting nuts 114 rotatably mounted in the outer frame 11 and engaging with screws 112 having heads 110. The heads 110 engage with the respective corner sections 113, and are prevented from rotation by pins 111. A continuous resilient sealing strip or flange 115 covers the edges 116 of the inner frame 12 and extends across the gap 117 between the frames 11 and 12, being secured between a continuous metal frame 118, and four metal locating strips 119 which are mitred, and slightly spaced apart at their ends at 119a. The frame 118, strips 119 and sealing flange 115 are secured to the outer frame 11 by screws 120. A portion 121 of the resilient sealing flange 115 projects outwardly beyond the frame 118 and strips 119. A glass photographic plate 17 having an image bearing surface 23 is placed, bare glass side down, upon the portion of the resilient sealing flange 115 covering the edges 116 of the inner frame 12, and the image bearing surface 23 is adjusted into substantially coplanar relationship with the upper surfaces 124 of the metal locating strips 119 by adjustment of the nuts 114 which act to move the corner sections 113 and inner frame 12 relative to the outer frame 11. The plate 17 may then be clamped edgewise in two mutually perpendicular directions, between pads 125 and adjustable clamping pads 126, which clamping pads 126 are actuated by rocking arms 127 and clamping screws 128. The resilience of the sealing flange 115 permits the adjusting movement of the inner frame 12 to bring the faces 23 and 124 into coplanar relationship as aforesaid. The inner frame 12 is constrained against movement relative to the outer frame 11 (except for the said adjusting movement perpendicular to the plane of the frames) by the corner sections 113. A conduit 129 is provided for connecting to a source of vacuum so that when the faces 23 and 124 are placed in contact with a plane surface, such as a photo-sensitive printing plate, those surfaces 23 and 124 are urged into close contact with the said plane surface under the action of the vacuum. The portion 121 of the resilient flange 115 provides an airtight seal with the said plane surface, and the resilient flange 115 also provides an airtight seal with the plate 17. The slight spaces 119a between the mitred ends of the strips 119 permit the vacuum to enter the space bounded by those strips.

In each of the constructions just described, each side of the outer frame is provided with three locating faces 31, 32, 33. The locating faces 31, 32 are provided by the outer ends of adjusting screws 34 which project from the frame 11 and are in screw-threaded engagement with the frame 11. Locking screws 35 are provided. In the case of FIGURES 1 and 2 the screws 34 are also in threaded engagement with split tube inserts received within the frame 11. Each of the split tube inserts has radially projecting flanges which are engaged by locking screws 35 so that each of the adjusting screws 34 may be locked in adjusted position. In the case of FIGURES 11–17 the locking screws 35 clamp the screws 34 through sleeves 30. Each locating face 33 is provided by one end of an adjusting screw 36 which is in screw-threaded engagement with one limb of a bridge-piece 37 secured to the outer frame 11 by screws 38 and dowels 39. The adjusting screw 36 is provided with a locking nut 41 in order that it may be locked in adjusted position.

The register or datum device 201 comprises a glass register plate 202 having inscribed thereon accurately positioned so-called horizontal and vertical datum lines, 203, 204, which plate is firmly mounted in a protecting frame-work 205 which slopes upwardly and rearwardly from a pedestal base 206. The glass register plate 202 is illuminated from behind. On a rigid horizontal bar 42 extending across the bottom of the lower horizontal limb of the frame-work of the datum plate, there are mounted two rigid locating plates 43 which are secured to the bar 42 by screws 44 and dowels 45. The upper face 46 of each of the plates 43 is closely parallel to the horizontal datum lines 204 of the register plate 202 and provides a locating face which is in a permanent relationship with the datum lines on the datum plate. When the holder is located on the register device (as shown in FIGURES 3 and 5) one pair of the locating faces 31, 32 rest on the locating faces 46 and consequently permit the holder, and the negative plate 17 which is firmly clamped to it, to be brought into desired orientation and position with respect to the horizontal datum lines 204 of the register plate, by adjustment and subsequent locking of the adjusting screws 34. A hardened steel block 47 is rigidly mounted on the plate 43, and the block 47 has a vertical locating face 51 in engagement with the locating face 33 of relevant adjusting screw 36 of the holder. The block 47 has a steel plunger 52 slidable in a bore 53 and urged outwardly thereof by a compression spring 54 to engage with the shorter arm 55 of a right-angled crank 56 which is pivoted to the bar 42 at 57. The long arm 58 of the crank 56 is engageable with a catch 59 to hold the plunger 52 inwardly of the block 47 against the action of the spring 54. When the holder has been suitably positioned with one of its bridge-pieces 37 embracing the block 47, the arm 58 of the crank 56 may be released from the catch 59 so that the spring 54 urges the plunger 52 to press the arm 55 against the limb 62 of the bridge-piece 37, thereby urging the holder to a position such that the locating face 33 of the screw 36 of the holder bears against the locating face 51 of the block 47. The holder may then be brought into desired position relative to the vertical datum line 203 of the register plate by adjustment and locking of the adjusting screw 36.

The unit shown in FIGURES 6 and 7 is secured to the slide 210 of the saddle of the datum or traversing bar 211 of a known step-and-repeat photo-composing machine such as is shown in FIGURE 9. The unit shown in FIGURES 6, 7 and 8 comprises a slide 63 for co-operating with the slide of the saddle. The slide 63 is provided with a slide gib 64, means 65 for adjusting the slide gib 64 and a locking screw 66 for locking the unit in position on the saddle. The slide 63 carries a table 67 having two horizontal locating faces 68, 69 against which one pair of the locating faces 31, 32 of the negative holder bear when the holder is mounted on the unit. The table 67 also carries a block 71 having a vertical locating face 72 for the appropriate locating face 33 of the holder to bear against. The table 67 further carries two upwardly projecting members 73 having vertical faces 64 against which the lower horizontal limb of the holder is clamped. The clamping is effected by means of a G-clamp 75, one end 76 of which engages the member 73, and the clamping screw 77 at the other end of the clamp 75 engages with a bar 78 carried by guide bolts 79. The bar 78 is normally urged away from the members 73 by means of springs 81 acting on the guide bolts 79, to permit the holder to be brought into position on the unit. Before the clamp 75 is tightened, the appropriate locating face 33 of the holder is brought into engagement with the locating face 72 of the member 71 on the table 67, by means of a lever 82 which is pivoted to the table 67 at 83. An operating screw 84 is provided for rotating the lever 82 about its pivot 83 against the action of the plunger and spring 85, 86 so that the end 87 of the lever bears against the limb 62 of the bridge-piece 37 of the holder and thus moves the holder until the locating faces 33 and 72 abut. The clamp 75 is then tightened to secure the holder firmly to the unit.

The underside of the table 67 carries a rack 88 which engages with a pinion on the saddle, which pinion is rotatable by a handle 90 to carry the unit and the holder towards a photo-sensitive printing plate 91 until the surfaces 23, 24 of the negative plate 17 and the sealing flange 18 come into contact with the printing plate. Return movement of the holder in the direction away from the printing plate is limited by abutment of a stop 89, carried by the plate 67, against a part (not shown) of the saddle. The saddle is movable along the traversing bar of the step-and-repeat machine by known means.

The locating faces 31, 32, 33 on the other sides of the holder may be similarly adjusted with the holder in the appropriate angular position on the register device. The holder can then be rotated through 90, 180 or 270 degrees on the step-and-repeat machine and in each of these positions it will be accurately located on the machine by the adjusted locating faces of the holder.

Holders in accordance with these examples may be employed, for instance, for holding two or more colour-separation negatives or transparencies prepared from an original coloured picture or photograph. The original is normally provided with fine cross lines drawn at four positions spaced at 0, 90, 180 and 270 degrees around the border, and each colour-separation negative or transparency bears reproductions of these cross lines. The adjustable locating means of each holder may be adjusted to bring the cross lines into a predetermined relationship with the datum lines of the register device, thereby to ensure that each print made on the printing plate is in the correct register and so that the lithographic impressions made subsequently from the printing plates will be accurately superimposed. The holders may alternatively be employed in connection with single colour or black printing to assist in ensuring accurate positioning and orientation of the final printed image or images.

The invention is not restricted to the details of the foregoing examples. For instance, the plunger and spring arrangement 52, 53, 54 may be provided in a second block below the block 47, instead of in the block 47 itself. The plunger 52 in that case bears against the arm 55 nearer to the pivot 57.

We claim:

1. A plate holder for a step-and-repeat photocomposing machine, which holder comprises a frame, a plate mounted in said frame in fixed co-planar relationship thereto, two locating members projecting from each side of said frame at spaced positions therealong, each of said locating members being lengthwise adjustable with respect to said frame and having a locating face directed outwardly thereof, whereby each of said locating faces can be set in predetermined relationship to said plate carried by said frame, and a third locating member carried by said frame on each side thereof at a position adjacent to each of said sides, each of said third locating members having a third locating face directed transversely to the direction in which each of said two locating faces are directed, whereby each of said third locating faces can be set in predetermined relationship to said plate, said locating members adjusting the position of each side of said frame thereby adjusting the position of the plate with respect to each of said sides without moving the plate with respect to the frame, whereby said holder may be rotatably positioned on said photocomposing machine through 90, 180 or 270 degrees.

2. A holder for a plate from which a photographic print is to be made on a photo-sensitive surface, said holder comprising an outer frame, an inner frame, said plate mounted in said inner frame in fixed co-planar relationship thereto, said inner frame supported within said outer frame for adjusting movement relative to said outer frame in a direction perpendicular to the plane of said outer frame, an airtight flexible diaphragm contacting both said plate and said photo-sensitive surface and extending between said inner and outer frames, said diaphragm adapting said frames for said relative adjusting movement therebetween while maintaining an airtight seal between said plate, said inner and outer frames, and said photo-sensitive surface, and adjustable locating means comprising two locating members projecting from each side of said frame at spaced positions therealong, each of said locating members being lengthwise adjustable with respect to said frame and having a locating face directed outwardly thereof, whereby each of said locating faces can be set in predetermined relationship to said plate carried by said frame, and a third locating member carried by said frame on each side thereof at a position adjacent to each of said sides, each of said third locating members having a third locating face directed transversely to the direction in which each of said two locating faces are directed, whereby each of said third locating faces can be set in predetermined relationship to said plate, said locating members adjusting the position of each side of said frame thereby adjusting the position of the plate with respect to each of said sides without moving the plate with respect to the frame, whereby said holder may be rotatably positioned on an associated photographic printing apparatus through 90, 180 or 270 degrees.

References Cited in the file of this patent
UNITED STATES PATENTS

| | | |
|---|---|---|
| 1,478,828 | Jones | Dec. 25, 1923 |
| 1,646,595 | Rein | Oct. 25, 1927 |
| 1,780,677 | Huebner | Nov. 4, 1930 |
| 1,786,070 | Jones | Dec. 23, 1930 |
| 1,787,662 | Boedicker | Jan. 6, 1931 |
| 1,870,008 | Huebner | Aug. 2, 1932 |
| 1,996,966 | Koppe | Apr. 9, 1935 |
| 2,237,704 | Huebner | Apr. 8, 1941 |